United States Patent [19]

Dunning

[11] Patent Number: 4,952,816

[45] Date of Patent: Aug. 28, 1990

[54] FOCUS DETECTION SYSTEM WITH ZERO CROSSING DETECTION FOR USE IN OPTICAL MEASURING SYSTEMS

[75] Inventor: Christopher C. Dunning, Bristol, United Kingdom

[73] Assignee: Renishaw plc, England

[21] Appl. No.: 358,387

[22] PCT Filed: Oct. 17, 1988

[86] PCT No.: PCT/GB88/00872

§ 371 Date: May 22, 1989

§ 102(e) Date: May 22, 1989

[87] PCT Pub. No.: WO89/04007

PCT Pub. Date: May 5, 1989

[30] Foreign Application Priority Data

Oct. 20, 1987 [GB] United Kingdom ............... 8724575

[51] Int. Cl.$^5$ .................. G01N 21/86; G01J 1/20
[52] U.S. Cl. ................... 250/560; 250/201.4
[58] Field of Search ............ 250/201, 560, 561; 369/45, 46; 356/375, 376, 4

[56] References Cited

U.S. PATENT DOCUMENTS

| | | |
|---|---|---|
| 3,491,240 | 1/1970 | Vyce .................... 250/209 |
| 4,363,116 | 12/1982 | Kleuters et al. ........... 369/45 |
| 4,495,407 | 1/1985 | Kodama et al. ........... 250/201 |
| 4,513,408 | 4/1985 | Nomura et al. ........... 369/46 |
| 4,546,460 | 10/1985 | Ando .................... 369/45 |
| 4,683,561 | 7/1987 | Bierhoff et al. ........... 369/45 |
| 4,766,305 | 8/1088 | Fahl .................... 250/201 |
| 4,815,060 | 3/1989 | Nomura .................. 250/201 |
| 4,816,665 | 3/1989 | Hsu ..................... 250/201 |

FOREIGN PATENT DOCUMENTS 0121989 10/1984 European Pat. Off. .
2120493 11/1983 United Kingdom .

OTHER PUBLICATIONS

"Non-Contact Probe Uses Light to Measure Curved Surfaces", OEM Design, Oct. 1986, p. 11.

Primary Examiner—David C. Nelms
Assistant Examiner—Michael Messinger
Attorney, Agent, or Firm—Oliff & Berridge

[57] ABSTRACT

The invention concerns a focus detection circuit for an optical trigger probe. The probe has a laser light source, a beam splitter and a focusing lens system. The probe produces a light beam focused to a point at a distance d from the probe. Light reflected from the surface is reflected from the beam splitter onto two pairs of photosensitive detectors. The signals from the two outer detectors are added as are the signals from the two inner detectors, and the two sums are subtracted to provide a focus error signal which is passed to a zero crossing detector. When the light beam is focused on the surface, the difference between the sums of the detector signals will be zero and the zero crossing detector circuit emits an output pulse. To eliminate false trigger signals when the probe is some distance from the workpiece and the reflected light is minimal, a validating signal is generated by measuring the intensity of the relected light at a detector. The validating signal so produced, based upon the reflected light, is passed to an AND gate along with the output pulse. The AND gate only transmits a trigger signal when a validating signal and an output pulse are present at the same time.

11 Claims, 2 Drawing Sheets

FOCUS DETECTION SYSTEM WITH ZERO CROSSING DETECTION FOR USE IN OPTICAL MEASURING SYSTEMS

BACKGROUND OF THE INVENTION

The present invention relates to a focus detection circuit for detecting when the focal spot of a focussed light beam is in focus on a surface towards which the light beam is directed.

It is known in optical scanning probes to focus a light beam from a semiconductor laser onto a surface using a movable objective lens. The reflected light is re-focussed inside the probe onto a focus detector consisting of a pair of photo-diode detectors, the output of which controls a lens tracking mechanism which maintains the focal point on the surface. The design is such that a displacement of the object surface in the direction of the light beam results in a change in the distribution of light energy falling on the photo-diodes. This provides a focus error signal which is used to move the lens in a direction such as to reduce the focus error signal to zero, at which point the focal point of the light beam is back on the surface.

The above-described tracking mechanism relies on the fact that the focal point is always at the same distance from the lens, when using a collimated or coherent light source, so that the movement of the lens which is required to bring the light spot back into focus on the surface equates to the movement of the surface.

It is also known to provide an optical trigger probe (for example a probe described in an article in OEM DESIGN published in Oct. 1986) which may be moved towards a surface and provides a signal when a beam emitted by the probe comes into focus on the surface.

SUMMARY OF THE INVENTION

It is an object of the present invention to provide a focus detection system suitable for use with an optical trigger probe.

According to the present invention there is provided an optical measuring system comprising a probe having a housing, a light source and a focussing device mounted within the housing for producing a light beam focussed at a point outside the housing, and a focus detection system for receiving light reflected from a surface towards which the light beam is directed, charactrised in that the light source and the focussing device are mounted in fixed relationship within the housing, the focus detection system including detector means for producing two outputs indicative of the amount of said reflected light falling on different parts thereof and receiving said two outputs and for producing a focus error signal which has a zero value when the light beam is in focus on the surface and a non-zero value when the light beam is out of focus on the surface, and wherein the focus detection system further includes a zero crossing detection circuit for detecting the zero crossing points of the focus error signal and for producing an output each time a zero crossing is detected.

In such a system the focal point is always a fixed distance from the lens, and provided that the lens position is accurately known within the probe body, and the probe position is accurately known from the scales of a measuring machine on which the probe is mounted, the position of the surface along the line of the light beam can be accurately determined by noting the machine scale readings when the output signal is produced.

The above described focus detection system however has a range limited to a few tens of microns. Outside this range the focus error signal tends towards zero, and any noise in the system due, for example, to vibration of the probe, or stray light within the probe, can give rise to large numbers of zero crossings when the reflected light level from the surface 12 is low or zero. Thus the zero crossing detector circuit may provide a large number of false trigger signals when operating outside of this range.

A probe with a focus detector system as described above can be used for detecting small variations of shape or in surface detail of a workpiece provided that the position of the surface remains within the working range of the probe.

In order to adapt such a probe for use with a co-ordinate measuring machine in which the probe is driven towards a surface from a point some distance away, and outside the normal operating range of the focus detector system, it is necessary to determine which of the trigger signals being produced from the focus detection system are false and which are genuine.

According to a feature of the invention the focus detection system includes a validating circuit which determines the intensity of the reflected light falling on the detectors and which produces a validating signal only when the intensity of the reflected light received by the detectors is greater than a pre-determined level thus indicating that a genuine focus detection signal has occurred.

By this means false trigger signals can be filtered out and the only trigger signals which are passed to the machine are those which are accompanied by a validating signal.

In a preferred embodiment of the invention the validating circuit determines both the intensity of the reflected light received by the focus detection circuit and the distribution thereof.

BRIEF DESCRIPTION OF THE DRAWINGS

Examples of the invention will now be described with reference to the accompanying drawings in which.

DESCRIPTION OF THE PREFERRED EMBODIMENTS

Figure 1:
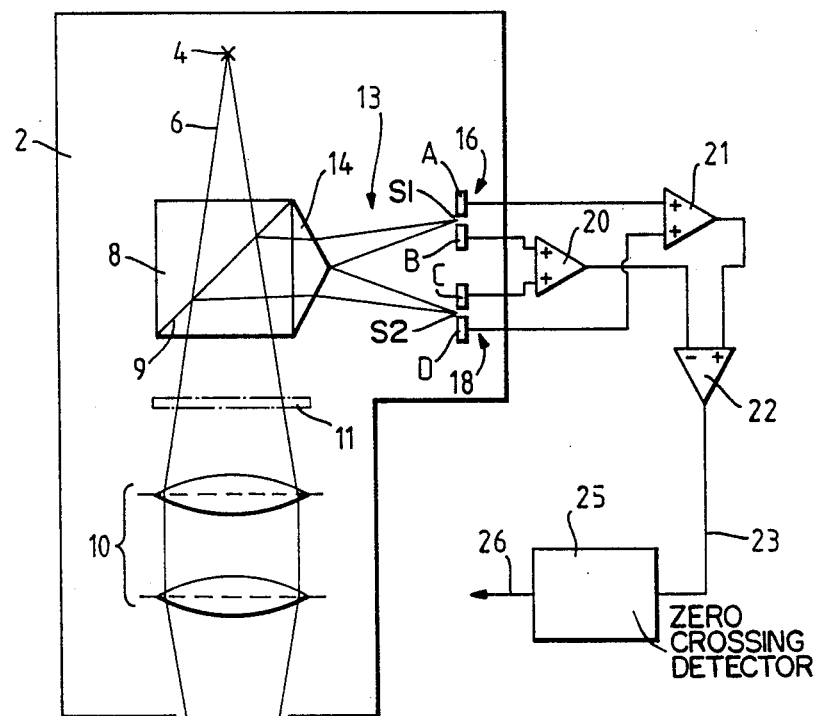
FIG. 1 illustrates diagrammatically the components of an optical trigger probe according to the present invention.
Figure 2:
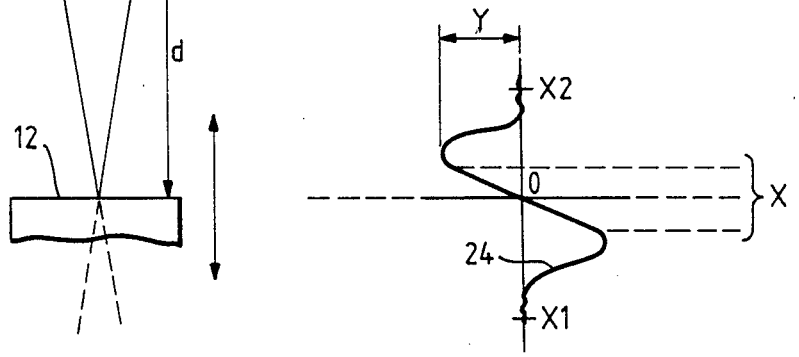
FIG. 2 shows the shape of the focus error signal produced by the detectors in the probe of FIG. 1 as the focal point of the light beam moves through a surface.

Referring now to FIGS. 1 and 2 there is shown a probe having a housing 2 within which are mounted, a light source 4, a beam splitter 8, and a fixed focussing lens system 10. The light source 4, which may be a laser diode, produces a light beam 6 directed towards the beam splitter 8 which may be of any known type. At least a portion of the beam is transmitted through the beam splitter to the lens system 10 which focusses the beam to a point at a distance d from the probe. Distance d is the stand off distance from the probe to a workpiece 12 on which the probe performs measuring operations.

The beam splitter 8 forms part of a focus detection system mounted within the housing and indicated generally by the reference 13. The focus detection system also includes a prism 14 and two pairs of photo-diode detectors 16, 18, the individual detectors A, B and C, D of each pair being separated by spaces S1 and S2. The beam splitter 8 has an inclined surface 9 which transmits the light beam from the light source to the lens system 10, but reflects light reflected back from the surface 12 at right angles towards the photo-diode pairs 16 and 18. The reflected light from the beam splitter 8 passes through the prism 14 which splits it into two beams directed onto the photo-diode pairs. The diagrammatic representation given in FIG. 1 shows a ray diagram of the beam in the focussed condition.

The arrangement is such that when the light beam 6 is focussed onto the surface 12, the reflected light will be focussed onto the spaces S1 and S2 between the photo-diodes in each pair. The light spots formed by the prism in the spaces S1 and S2 are arranged, in this focussed condition, to overlap the edges of the two detectors A, B and C, D equally on both sides of both of the spaces. When relative movement between the surface 12 and the probe causes the focal point of the light beam to move to a position above or below the surface 12, the two beams leaving the prism 14 will become more or less divergent, and the spots formed by them on the photo-diode pairs will both move either more towards the outer two detectors A and D, or towards the inner two detectors B and C. The result is that the amount of light received by the outer two detectors A and D will either increase or decrease and at the same time the amount of light received by the inner two detectors B and C will respectively decrease or increase.

The outputs of the inner two detectors B and C are connected at a summing junction 20 and the outputs of the outer two detectors A and D are connected at a summing junction 21. The outputs of the two summing junctions 20 and 21 are subtracted at a further junction 22 which produces an output 23 in the form shown by the curve 24 of FIG. 2. The distance x, between the two peaks of the curve, gives the working range of the detector as the focal point of the light beam moves up and down, and the amplitude of the peaks y, gives the focus error signal. A zero crossing detector circuit 25 (known per se) is used to determine the point 0 on curve 24 in the working range of the detectors at which the difference in the outputs of the outer and inner detectors is zero, which indicates that the beam 6 is focussed on the surface 12. The zero crossing detector circuit produces an output 26 in the form of a pulse every time a zero crossing is detected.

However, the optical trigger probe in operation will be mounted on a machine for detecting and for measuring the surface 12. The focal point or spot of the probe will thus often be outside the working range x of the detectors since this is limited to a few tens of microns of relative movement between the surface 12 and the probe.

It can be seen that as relative movement between the probe and the surface causes the surface to move further away from the focal point of the light beam, the reflected light becomes more diffused, and the spots formed by the prism 14 on the detectors 16 and 18 become rapidly larger and less intense until they cover both detectors and the difference signal from junction 22 tends to zero. Ignoring any effects of stray light reflections on the detectors this would give a false trigger signal from the zero crossing detector at point $x_1$ or $x_2$ outside the working range of the detectors 16, 18. In fact when the probe is some distance from the workpiece the reflected light level is zero and occurrence off a zero crossing signal from the detector 25 becomes unpredictable.

In order to avoid this problem a validating circuit is introduced into the probe circuitry and which is arranged to determine when the zero crossing point on curve 24 lies inside the working range of the detectors and outputs a signal accordingly.

One simple method of producing a validating signal would be to add the outputs from all of the four detectors A, B, C, D and compare them with a minimum pre-determined threshold value.

Figure 3:
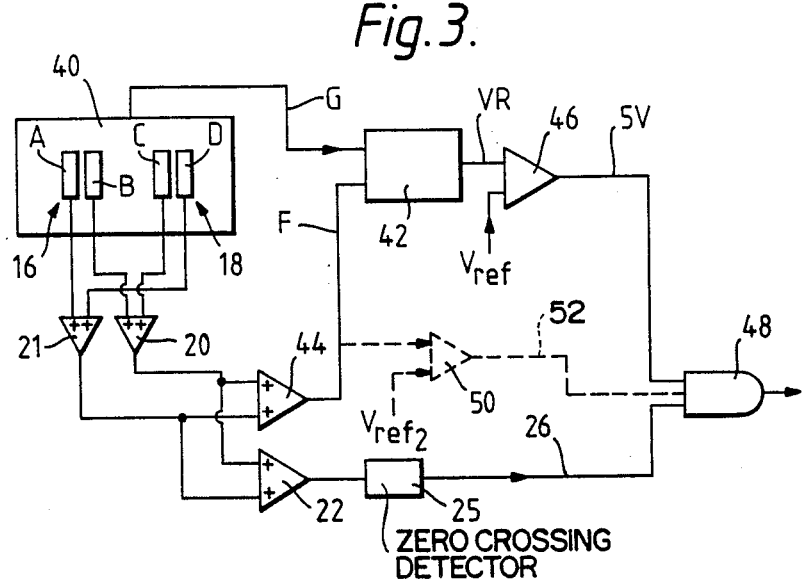
FIG. 3 shows one embodiment of a validating circuit for use with the probe of FIG. 1

A preferred method of producing a validating signal is shown in FIG. 3. The four focus detectors A, B, C, D are mounted on a larger photo-sensitive guard detector 40 which will be illuminated by light spilling around the focus detectors when the light spots generated by the prism become enlarged as the surface 12 moves away from focus. The guard detector 40 forms part of a validating circuit and provides a "noise" signal indicative of the intensity of the reflected light and other stray light near the detectors.

The focus detection system will only operate correctly when the light from the prism forms two defined spots on the detector pairs 16, 18. If this is not the case, i.e. when the light beam 6 is far from being focussed on the surface 12, the guard detector and the detector pairs will be weakly illuminated by the reflected light. The ratio of the sum of the signals from the detector pairs 16, 18 and the noise signals from the guard detector, which will be referred to as the signal to noise ratio, will be proportional to the areas of the detectors.

As the probe approaches focus, the intensity of diffuse illumination across all of the detectors will increase, and the ratio of the signals described above will remain constant until the point is reached where the two spots from the prism begin to be defined on the detector pairs 16, 18. The output from the guard detector will then start to drop while the output from the detector pairs increases. The threshold ratio can be set at the level at which the detector pairs 16, 18 are within their working range and a validating signal generated when this level is reached. Only those zero crossing signals developed while the validating signal is present will then be sent to the machine as true probe trigger signals.

On receipt of a true probe trigger signal the machine will be braked to stop further movement of the probe towards the surface 12. Braking must be achieved within the stand off distance d.

In FIG. 3 the remainder of the validating circuit is shown as including a divider 42 which receives an input G from the guard detector and an input F from a summing junction 44 which represents the sum of the four focus detectors A, B, C and D. The divider provides an output VR equal to the ratio of inputs F:G. The output VR of the divider is passed to a comparator 46 which also receives a reference voltage V ref 1, which provides a threshold value. The comparator 46 outputs the validating signal SV when the ratio F:G rises above the threshold value.

As described above the signals SV from the validating circuit and the signal 26 from the zero crossing detector are arranged to be positive and are passed to an AND gate 48 which produces a validated trigger signal only when signals SV and 26 are present at the same time.

However, when the probe is completely removed from the presence of the workpiece there will be no reflected light received by the detectors 16, 18. Under these circumstances any stray light falling on the detectors 16, 18 and on the guard detector will be unpredictable and may be such as to provide a signal to noise ratio greater than the threshold value.

Several modifications may be made to obviate this problem. One modification is shown in dotted lines in FIG. 3. A further comparator 50 is provided to which is connected both the signal F from the summing junction 44 and a further reference voltage Vref2. The comparator 50 outputs a signal 52 when the ratio of the signal F to voltage Vref2 is greater than a pre-determined threshold indicating that a positive signal has been received from the detectors 16, 18 in excess of any noise signal. The output signal 52 is passed as a third input to the AND gate 48 as a further verification that the signal from the detector 25 is a true signal.

Alternatively, bias signals can be added to each of the signals F and G which are greater than the anticipated noise levels. The bias signals are in a ratio such that when there is no reflected light from the workpiece surface, the addition of any noise signals to the bias signals will not cause the value of the ratio F:G to exceed the threshold value. The bias signals may be generated externally of the probe or may be derived from the amount of stray light from the source 4 which is reflected onto the detectors. This stray light would affect the guard detector and the detectors 16, 18 in the ratio of their areas.

Figure 4:
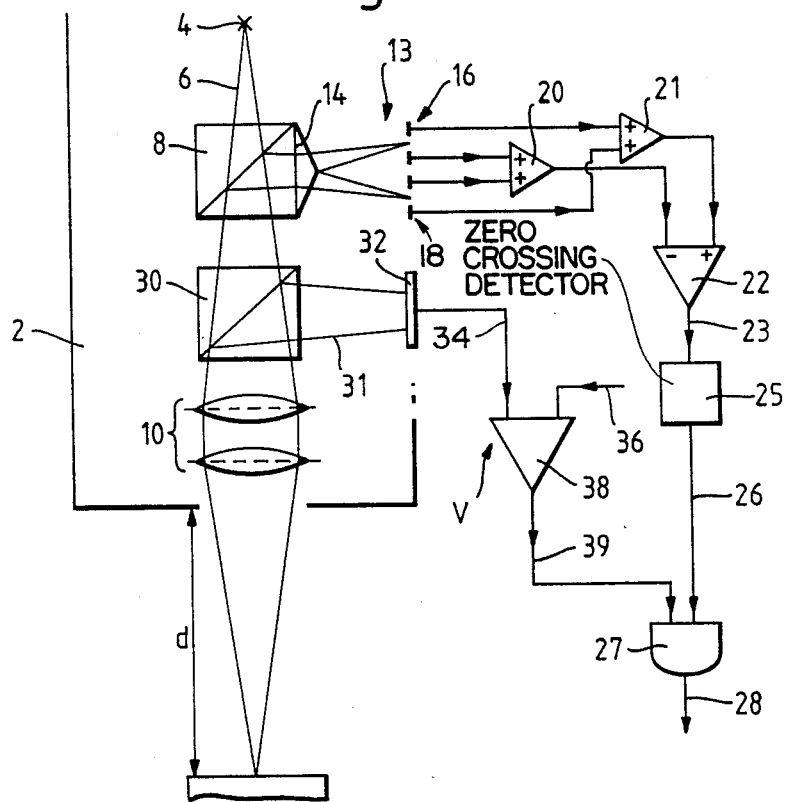
FIG. 4 shows an alternative embodiment of a validating circuit for use with the probe of FIG. 1.

FIG. 4 shows an alternative method of producing a validating signal. A further beam splitter 30 is provided in the path of the reflected light from the surface. This is arranged to deflect a known portion of the reflected light onto a second detector system in a beam 31 while transmitting the remainder to the beam splitter 8. The second detector system which forms part of the validating circuit V, consists of a single photo-diode detector 32 arranged to receive all of the light in the beam 31 from the beam splitter 30. The output 34 of the detector 32 provides a measure of the total light intensity which is directed from the mirror surface 9 towards the detectors 16, 18. The output 34 is compared with a reference voltage 36 in a comparator 38, and the output 39 of the comparator is the validating signal which indicates when the output 34 is above the threshold. This indicates that the intensity of light falling onto the detectors 16, 18 is within the working range of the detectors. In order to determine the distribution of the light falling on detector 32, the detector 32 is preferably located at the focal point of the deflected beam 31.

The validating signal 39 is passed to a gate 27 along with the output 26 of the zero crossing detector, and the gate produces an output 28 to be passed to the machine only when the two outputs 26 and 39 indicate that a trigger signal and a validating signal have been generated simultaneously. The gate may be an AND gate as shown if both outputs 26 and 39 are positive but may be an OR or a NOR gate if alternative outputs are desired from the zero crossing detector and the validating circuit.

Where it is considered undesirable to have stray light falling on the detectors the modification illustrated in dotted lines in FIG. 1 may be adopted. In such a modification the light source is a laser and the beam 6 is a polarised beam. The beam splitter 8 is a polarising beam splitter the polarisation state of which is such as to allow transmission of the beam through the beam splitter. A quarter wave plate 11 is provided in the path of the beam so that the reflected beam from the surface 12, after passing twice through the wave plate will be reflected from the inclined surface 9 of the beam splitter onto the detectors. This modification will increase the intensity of the light reaching the detectors since no part of the beam will be reflected at the beam splitter, will thus eliminate stray reflected light from the beam splitter, and will prevent any part of the reflected light from the surface 12 being transmitted through the beam splitter back to the laser.

Many other modifications may be made to the particular embodiments described above. For example, the light source 4 is preferably combined with a collimating lens so that the light beam is collimated before reaching the half-silvered mirror. The light source may in fact be a laser which produces a coherent light beam. The lens system 10 may be a single focussing lens.

In a simplified form of validating circuit the light source may be pulsed, whereby the ambient light levels inside the probe can be detected by detectors ABC and D during the "off" periods of the light source and subtracted from the signals received during the "on" periods. By this means a true signal level can be obtained during the "on" periods and an appropriate threshold level set to produce the validating signal.

The four photo-diode detectors A, B, C, D may be replaced by a quadrature cell divided into four separate detectors and the prism 14 would then be eliminated. The prism 4 may in any case be substituted by a diffraction grating.

In a simplified version of the FIG. 3 embodiment the guard detector 40 and the focus detectors may be combined as elements of a photo-diode array, four elements of which are designated detectors ABC and D. Also the gate 44 may be present as hardware in the electronics of the system or as software in the machine software.

The machine on which the probe is mounted has not been described in any detail but it is to be understood that the probe of the present invention could be used in conjunction with any co-ordinate measuring machine or even a machine tool.

What I claim is:

1. An optical measuring system for use with a machine comprising a probe having a housing, a light source and a focussing device mounted within the housing for producing a light beam focussed at a point outside the housing, and a focus detection system for receiving light reflected from a surface towards which the light beam is directed, characterised in that the light source and the focussing device are mounted in fixed relationship within the housing, the focus detection system further comprising first and second detector means for producing two outputs indicative of the amount of reflected light falling on different parts thereof and function means for receiving said two outputs and for producing a focus error signal which has a zero value when the light beam is in focus on the surface and a non-zero value when the light beam is out of focus on the surface, and wherein the focus detection system further comprises a zero crossing detection circuit for detecting the zero crossing points of the focus error signal and for producing an output each time a zero crossing is detected, the output being passed to the machine on which the probe is mounted.

2. An optical measuring device as claimed in claim 1, wherein the focus detection system includes a beam splitter disposed in the path of the light reflected from the surface to deflect at least a portion of the reflected light toward the first and second detector means.

3. An optical measuring system as claimed in claim 1, wherein the focus detection system further comprises a validating circuit for producing a validating signal output only when the intensity of the light reflected from the surface is greater than a pre-determined minimum level, and gate means are provided for receiving, as input signals, both the output of the zero crossing detector circuit and the validating signal output, and for providing a further output only when both of said input signals are present.

4. An optical measuring system as claimed in claim 3, wherein the validating circuit includes means for providing an intensity signal indicative of the total intensity of the light reflected from the surface, and means for comparing the intensity signal with a threshold level and for providing an output forming the validating signal output when the intensity signal is greater than the threshold level.

5. An optical measuring system as claimed in claim 4, wherein the means for providing an intensity signal comprises a further beam splitter positioned in the path of the light reflected from the surface and which deflects a known portion of the reflected light onto a second detector system.

6. An optical measuring system as claimed in claim 3, wherein the validating circuit includes a photo-sensitive guard detector on which the first and second detector means are mounted, the guard detector receiving light spilling around the first and second detector means and providing a noise signal indicative thereof, divider means for determining the ratio of the detector signal and the noise signal, and comparator means for comparing the signal to noise ratio with a threshold value and which provides an output forming the validating signal output when the signal to noise ratio exceeds the threshold value.

7. An optical measuring system as claimed in claim 6, wherein a further comparator is provided which compares the sum of the first and second detector means outputs with a threshold level and produces an output only when the sum of the first and second detector means outputs exceeds the threshold level, the output of the further comparator being passed as a third input signal to the gate means, said gate means producing an output only when all three input signals are present.

8. An optical measuring system as claimed in claim 1, wherein the light source is a laser beam generator.

9. An optical measuring system as claimed in claim 8, wherein the laser beam produced by the laser beam generator is polarised in one plane, the beam splitter is a polarising beam splitter the polarising state of which is such as to transmit the laser beam therethrough, and a quarter wave plate is disposed between the beam splitter and the surface so that the beam passes through the quarter wave plate twice before it returns as reflected light from the surface and is thus polarised in a plane orthogonal to the original plane of polarisation and is reflected at the beam splitter towards the first and second detector means.

10. An optical measuring system as claimed in claim 2, wherein the focus detection system further comprises a validating circuit for producing a validating signal output only when the intensity of the light reflected from the surface is greater than a pre-determined minimum level, and gate means are provided for receiving, as input signals, both the output of the zero crossing detector circuit and the validating signal output, and for providing a further output only when both of said input signals are present.

11. An optical measuring system as claimed in claim 3 wherein the light source is a laser beam generator.

* * * * *